United States Patent

[11] 3,572,039

[72] Inventor: Albert Ray Osburn, Brigham City, Utah
[21] Appl. No.: 773,362
[22] Filed: Oct. 25, 1968
[45] Patented: Mar. 23, 1971
[73] Assignee: The United States of America as represented by the Secretary of the Air Force

[54] BOOSTER ROCKET MOTOR
2 Claims, 2 Drawing Figs.

[52] U.S. Cl. ............ 60/280, 60/251, 102/101
[51] Int. Cl. ............ F02k 9/06
[50] Field of Search ............ 60/250, 251, 39.47

[56] References Cited
UNITED STATES PATENTS
3,283,510  11/1966  Mangum et al. .......... 60/251
3,354,647  11/1967  Aycock .................... 60/251

Primary Examiner—Samuel Feinberg
Attorneys—Harry A. Herbert, Jr. and Herbert H. Brown ABSTRACT: An improved booster for a space vehicle or missile and in which the booster employs two types of propellants. The main charge consists of an oxygen-rich mixture cast in the form of a cylinder within the booster and the other charge, which serves as a covering or overlay for the main charge, consists of an oxygen-poor mixture formed as a hollow cylinder. The main charge is therefore rendered immune from combustion by the covering layer so that when oxygen is fed to the interior of the inner cylinder, the oxygen-poor mixture is able to support combustion, and as it burns through its own thickness the main charge becomes uncovered and ignites, due to the presence of the oxygen contained within the main charge. If the booster is one of several, clustered about the space vehicle and fails to ignite upon the introduction of the supplied oxygen, a valve controlled by an explosive bolt in the oxygen supply line is exploded which automatically cuts off the line to all the boosters and terminates the launching operation. In this way, the remaining boosters which might have functioned and therefore could have caused an imbalance of thrust would now have been rendered inactive so that the costly upper stages of the rocket are preserved.

PATENTED MAR 23 1971 3,572,039

INVENTOR.
RAY OSBURN

BY Harry A. Herbert Jr.
Herbert H. Brown
ATTORNEYS 3,572,039

BOOSTER ROCKET MOTOR

BACKGROUND OF THE INVENTION

In the art of propelling rockets, missiles, etc., into outer space, various kinds of propellants, liquid and solid, contained within the rocket are employed. When there is need for thrust power of considerable amount, as in the case of a heavy payload, it is customary to employ a number of booster rockets symmetrically positioned about the main rocket. These booster motors are temporarily attached to the main rocket or space vehicle. As the rocket complex is lifted from the pad and gains proper speed or distance, the added thrust of the booster rocket is terminated, either as a group, or in a predetermined order upon signal from the ground and the spent boosters automatically fall away from the main rocket. The latter continues its upward flight by the thrust developed by its own source of power. In the use of booster rockets, it is necessary that the addition of booster power when the spacecraft is actually being launched be accomplished in a strictly symmetrical manner in order to keep the vehicle pointed in the right direction. Obviously, all the boosters must be ignited simultaneously and in the event that one should fail, an imbalance of thrust is created which makes it imperative that the operation of all of the boosters should immediately cease.

SUMMARY OF THE INVENTION

An object of the invention is to provide a booster motor for attachment to a space vehicle or missile and in which the combustion within the booster can be terminated at will almost immediately after the propellant in the booster has been ignited.

Another object is to provide a cluster of solid propellant rocket boosters for spacecraft having a heavy payload and in which the boosters can be rendered simultaneously inoperative prior to the actual mount of launch.

These objects are carried out in brief by providing each booster unit with an auxiliary charge of an oxygen-poor solid propellant and a main charge of oxygen-rich solid propellant, one covering the other as an overlay, and then burning the oxygen-poor charge by introducing oxygen under strictly controlled conditions in the absence of which the auxiliary charge would not support combustion but would continue to cover and thereby protect the oxygen-rich charge from combustion. The introduction of oxygen can be terminated should an emergency arise, and assuming the oxygen-rich propellant has not been ignited in the meantime, the booster is rendered inoperative. The invention will be better understood when the following description is perused in connection with the accompanying drawing.

DESCRIPTION OF THE PREFERRED EMBODIMENT

Figure 1:
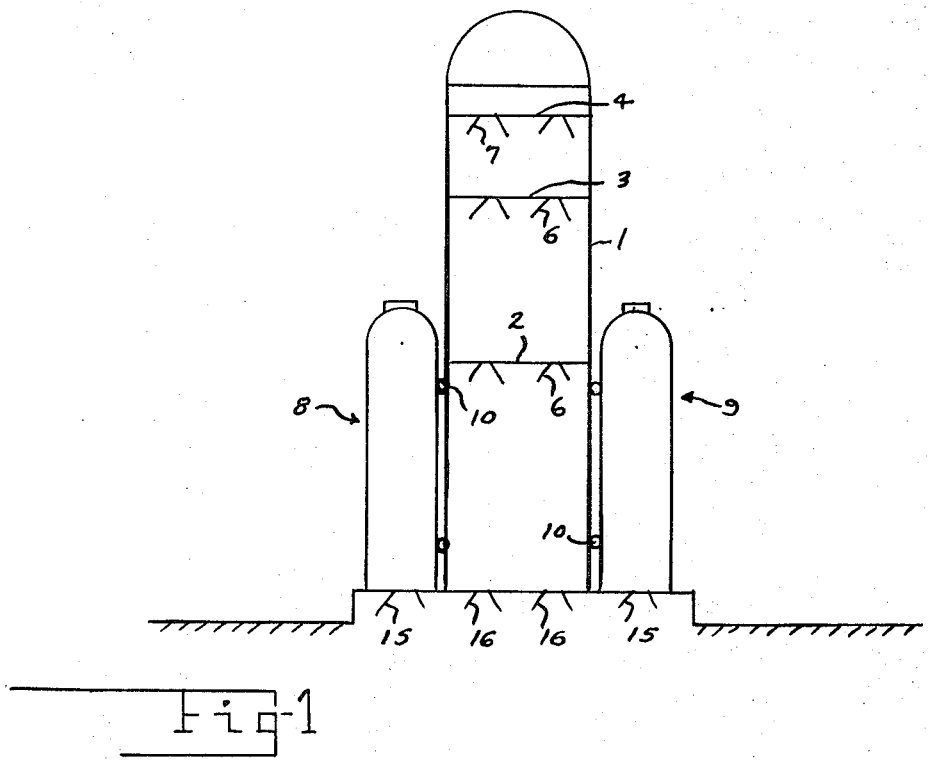
FIG. 1 represent a diagrammatic showing of a spacecraft to which the improved booster motors are attached and standing poised on a launching pad.

Referring to FIG. 1, there is shown by way of diagram a rocket vehicle 1 typified as a four-stage device. The walls or separation between the stages are broadly indicated at 2, 3 and 4 and the jet nozzles for the respective stages at 5, 6 and 7. Two boosters generally indicated at 8, 9 are typically illustrated, located on each side of the rocket vehicle for balance of power reasons, each booster being temporarily attached to the vehicle by a special and well-known form of fastener 10 which allows instant detachment on signal. The main vehicle and each of the boosters are provided with a streamlined top piece or cap and that of the vehicle may constitute a payload, space capsule or an explosive head (not shown).

When the payload is heavy or the rocket vehicle is designed to travel long distances in space and therefore must attain considerable acceleration at launch, it is customary to employ two or more boosters, symmetrically positioned with respect to the space vehicle in order to provide the necessary increase in jet power at takeoff. The main rocket is filled with solid propellant material (not shown) of well-known type, each stage, beginning with the lowest, being ignited in order, usually on command from the ground.

The boosters 8, 9 furnish the necessary extra lifting power at "blast off" and when the main vehicle has reached a predetermined speed or distance, the fastening devices 10 are disconnected or destroyed, to permit the boosters to fall away.

It has been found on occasion that when one or more of the boosters is not functioning satisfactorily, either just before or at the time of launch, this would cause a dissymmetry of the delivered power which might prevent the space vehicle from lifting from its pad or at least change its orientation. It has been the practice to secure the space vehicle to the pad by hold down devices (not shown) which are released when it is assured that all of the boosters, as well as the rocket motor, are all functioning. But the main difficulty has been to deactivate all of the boosters when one has failed during this period or during the short period after release but before the rocket has actually left the launching pad.

Figure 2:
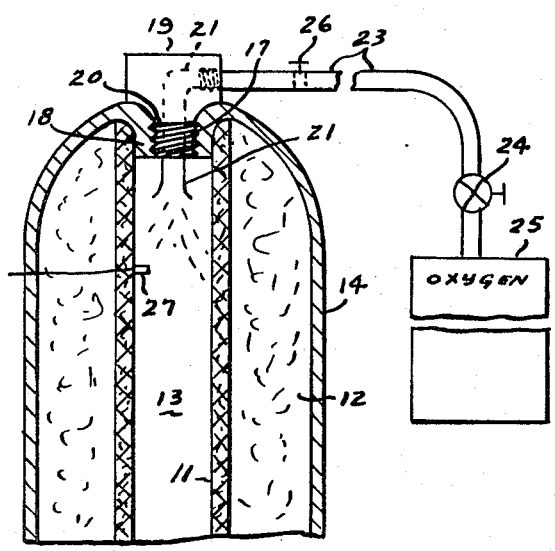
FIG. 2 shows the longitudinal section of one of the booster motors shown in FIG. 1, the lower end of the booster having been broken away. Certain ancillary apparatus is shown by diagram.

Whereas in the prior booster construction a single solid propellant was normally used, in accordance with my invention, I employ two different propellants, one within the other, the inner propellant being constituted of an oxygen-poor solid material and the outer propellant being formed of the standard oxygen-containing slow-burning explosive. The booster may take a cylindrical shape as shown, in which case the different propellants take the form of two hollow concentric cylinders 11, 12 (FIG. 2), cast in tight contact with one another and leaving a central longitudinal bore 13. The casting process can be accomplished by the use of mandrels as is well-known in the art. The casing of the booster, indicated at 14, is made of steel sufficiently thick to withstand the combustion of the contained propellants. The upper end of the casing 14 is rounded or pointed; actually shown as a hemisphere in order to give a streamline effect. The lower end of the booster (shown in FIG. 1) constitutes a flat sheet of metal of approximately the same thickness as the casing and is provided with openings which are positioned directly below the propellants 11, 12 and to which nozzles 15 are attached. The main space vehicle has similar nozzles 16 as is also indicated in FIG. 1 through which the jet stream is propagated from each of the various charges of propellants. It will be understood that the showing of the interior of the rocket 1 and the lower portions of the rocket, also of the boosters 8 and 9 including the pad on which they rest is purely diagrammatic and the actual launching structure is not shown.

The propellant body 11 is considerably thinner than that of the outer body 12 and these bodies are in intimate contact with one another. The cylinder 12 may constitute a heterogenous mixture of several chemicals, for example, a mixture of oxidizing crystals of perchlorate in a matrix of organic plasticlike fuel such as asphalt which embodies its own source of oxygen and therefore will support combustion. The inner cylinder may be constituted of the same ingredients except that the percentage of the oxidizing crystals of perchlorate is reduced to an amount that, in the absence of an additional source of oxygen, the propellant will not support combustion. Both propellants or equivalent material do or should lend themselves readily to being cast in place so as to fill up all the space within the interior of the casing 14 except the opening 13. As stated hereinbefore, this may be accomplished by the use of properly sized and positioned mandrels. The thickness of the overlay 11 will depend upon the burning rate of the propellant and the desired holddown time. A layer of propellant approximately 0.8 inch thick has been successfully employed and cast within a body 12 of considerably greater thickness.

The upper end of the casing 14 is provided at the center with a reentrant neck 17 having an opening 18 extending through the neck. This opening may be threaded as indicated at 18 to receive an injector plug 19 having a downwardly extending threaded portion 20. The neck of the plug is rounded at the top which fits a similarly curved surface at the upper end of the casing in order to effect a tight seal when the plug is screwed into the neck. There is a horizontal opening 21 extending part way through the plug 19. This opening is in communication with a vertical passageway which terminates in a nozzle 22. The latter extends a short distance into the central opening 13, and preferably, is flared outwardly at the edges. The horizontal portion 21 of the opening in the plug is provided with screw threads which receive the threaded end of a heavy copper tubing 23. This tubing may bend downwardly, as shown, and is provided with a shutoff valve 24 and from thence passes into a tank 25 containing liquid oxygen in any convenient form, such as nitrogen tetroxide. At the end nearer the plug 19, there is a squibactuated valve, termed in the trade an "explosive bolt" and indicated at 26, the purpose of which is abruptly to shut off the conduit 23 and thus disconnect the source of oxygen from the plug when a emergency arises. This explosive bolt is provided in accordance with one of the aspects of my invention and its actual construction and operation are well known in the art. Thus, assuming that the valve 24 is open and the bolt 26 is intact, i.e. unexploded, the oxygen-containing fluid from the tank 25 will flow through the conduit 23 and thence through the plug 19 into the central bore 13. This gas will supply the oxygen-poor propellant 11 with the necessary ingredient to cause the propellant 11 at least slowly to support combustion. The igniting impulse may be provided by an electrically energized pyrogen unit 27 in each unit, of well-known type which, when used in connection with the usual nozzle plugs (not shown) satisfactory ignition of the overlay propellant can be assured. All of the boosters are given an electrical stimulus at one and the same time. The oxygen-containing mixture is introduced into the central bore immediately prior to the liftoff and assuming that the propellant 11 has been duly ignited in the presence of the supplied oxygen, the resulting combustion will begin to burn through the propellant overlay or cover, and within a short time, will expose the surface of the oxygen-rich propellant 12. This time could be of the order of a few seconds, depending on the thickness of the overlay. The main charge 12 will then produce the propelling gas which, together with that obtained from the first stage of the space vehicle, will issue through the nozzles 15, 16 (FIG. 1) to attain the necessary power for liftoff. For maximum efficiency, the overlay should be designed to burn out simultaneously throughout the motor. Maximum thrust will be necessary for liftoff and this cannot be achieved until all of the overlay propellant has been consumed and the base propellant 12 has been exposed. However, should any one of the boosters fail to ignite, not withstanding having been supplied with the oxygen containing gas, the bolt 26 can be exploded by electrical impulse to close the valves simultaneously in all of the supply lines to the boosters and the propellant 11, having become starved for oxygen, will cease to be active and thus will fail to uncover any part of the surface of the propellant 12. Thus, the symmetry or balance of the thrust power about the space vehicle is maintained and the vehicle would, of itself, not have had sufficient power to lift from the pad. Accordingly, the explosive stages indicated at 2, 3 and 4 and the costly payload are saved.

From the foregoing, it is evident that I have invented an improved booster or booster assembly in which the functioning of all the boosters is assured during the launching operation and complete control of the operation of the boosters as a whole is accorded from the ground. In this manner, symmetry of the lifting power of the boosters in the aggregate is assured, so that the space vehicle will not deviate from its proper position and course as it leaves the launching pad.

I claim:

1. A jet booster for a space vehicle, said booster comprising a casing containing a plurality of propellants in layer form in overlying contiguous relation, the propellant overlying the other being of a material which is oxygen-poor and will burn only in the presence of oxygen, and the propellant over which the oxygen-poor propellant overlies being of a material which is oxygen-rich and will support combustion when ignited, means for supplying the overlying propellant with oxygen to cause the layer to burn through and expose at least a portion of the overlaid propellant whereby the oxygen-rich layer is caused to burn and produce jet action, and means including an explosion operated valve for shutting off the supply of oxygen to the overlying propellant before the overlaid layer has been exposed in order to stop combustion of the overlying propellant and prevent the overlaid layer from burning whereby the booster ceases immediately to operate.

2. A jet booster for a space vehicle, said booster comprising: a cylindrical casing containing a plurality of propellants of cylindrical configuration in layer form in overlying contiguous relation fitted within the casing, the propellant overlying the other being of a material which is oxygen-poor and will burn only in the presence of oxygen, and the propellant over which the oxygen-poor propellant overlies tightly surrounding the oxygen-poor propellant and being of a material which is oxygen-rich and will support combustion when ignited, an axial opening extending through the oxygen-poor propellant, said casing having a threaded reentrant portion, a plug having a threaded neck for entering said portion and being screwed thereto, said plug being provided with a passageway extending from the exterior of the plug as far as the axial opening in the oxygen-poor propellant, and a nozzle member extending from the exit of said passageway for a short distance along said opening, means for supplying oxygen through said plug and nozzle into said opening of the overlying propellant to cause the layer to burn through and expose at least a portion of the overlaid propellant to the hot gas evolved by the burning of the overlying oxygen-poor propellant whereby the oxygen-rich layer is caused to burn and evolve gas which when ejected from the rear of the booster provides a sustained jet stream, and means for shutting off the supply of oxygen to the overlying propellant before the overlaid layer has been exposed in order to stop combustion of the overlying propellant and prevent the overlaid layer from burning whereby the booster ceases immediately to operate.